United States Patent Office 3,384,577
Patented May 21, 1968

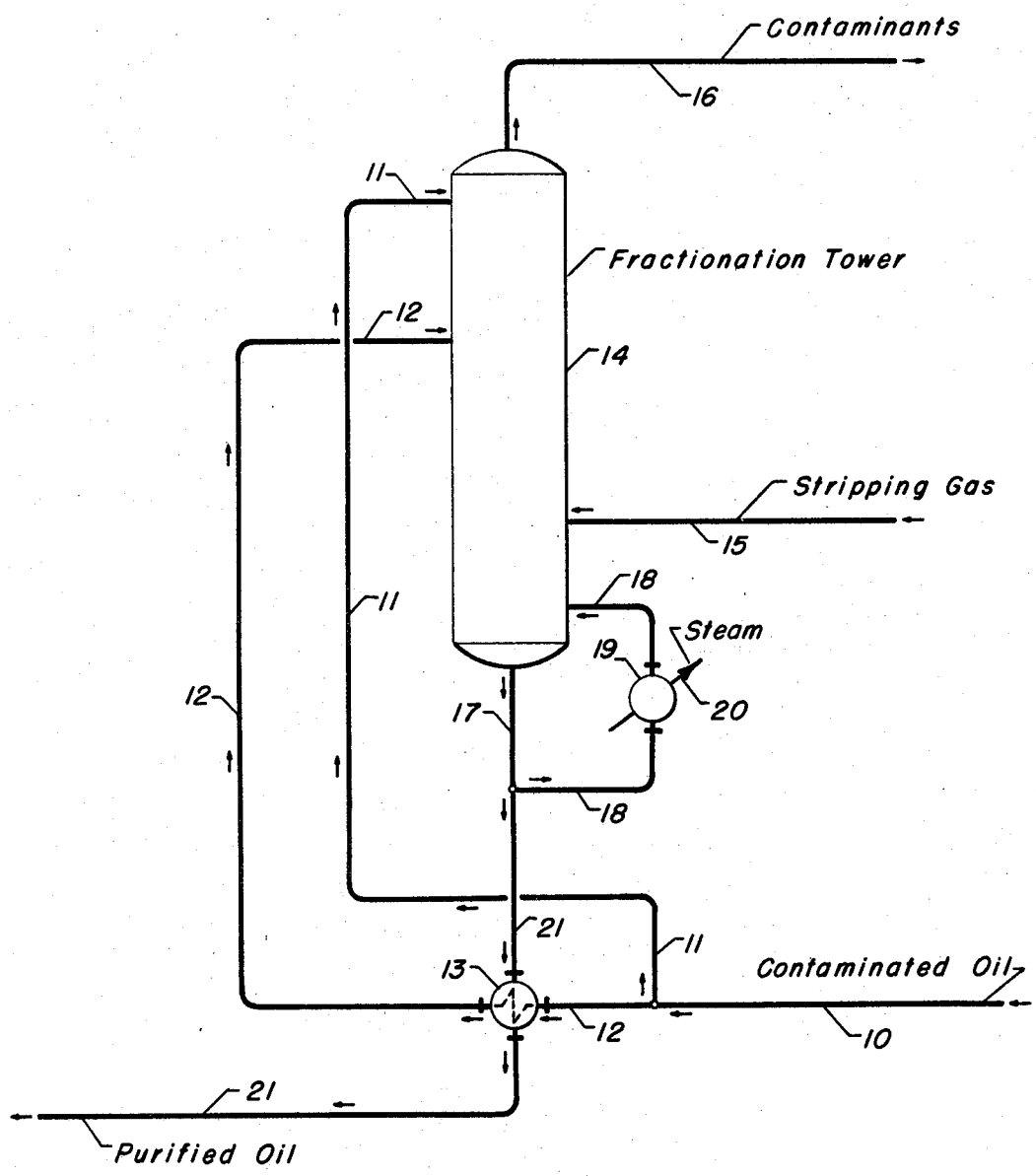

3,384,577
FRACTIONATION METHOD
Robert E. Shaffer and Richard J. Bergman, Glenview, Ill., assignors to Universal Oil Products Company, Des Plaines, Ill., a corporation of Delaware
Filed Mar. 2, 1967, Ser. No. 620,179
6 Claims. (Cl. 208—362)

ABSTRACT OF THE DISCLOSURE

Method of fractionation which passes unheated feed into the top of the tower, heated feed into the middle of the tower, introduces stripping gas into the lower end of the tower, and reboils the bottoms of the tower. This operation performs a fractionation of components, such as removal of $H_2S$ from an absorption oil.

Background of the invention

This invention relates to a method of fractionation. It also relates to a method for separating relatively light components in a feed mixture from relatively heavy components using fractionation means. It particularly relates to a method for separating dissolved gases from a normally liquid stream using an improved stripping column.

It is well-known in the art to use distillation or fractionation means to separate various components one from another which are present in a feed mixture. Virtually all chemical process units and/or petroleum process units have in some respect distillation means to separate the products which are made during the processing. Normally, the fractionation method involves the use of a distillation tower wherein a feed is injected at an intermediate location, heat is applied to the heavier portion, and reflux is used on the overhead system so that the upper portion of the distillation column operates as a rectification zone and the lower portion below the feed point operates as a stripping zone. This mode of operation, of course, is conventional and well-known and works satisfactorily on feed mixtures where it is desirable to separate lighter boiling components from heavier boiling components. On the other hand, if it is desired to remove very light components from a normally liquid stream, it is sometimes desirable to utilize the distillation means in strictly a stripping manner.

Accordingly, the prior art process of operating stripping towers, such as those useful in removing acid gases from an absorption medium, is generally to feed heated streams into the upper portion of a tower containing liquid and vapor contacting means, reboil the bottom portion of the tower, and inject steam or other inert stripping medium in the bottom section in order to strip the dissolved gases from the liquid stream. These gases are removed overhead while the purified or regenerated absorption oil is removed from the bottom of the tower and recycled, for example, back to the absorption zone for further use.

However, these prior art schemes have the disadvantage in that the heating of the feed material and injecting it into the tower frequently causes overflashing of desired hydrocarbons into the overhead stream. In other words, it is extremely difficult to operate a stripping tower as a true distillation and perform any kind of rectification. Similarly, for the distillation tower concept, it is necessary to take these light components overhead, condense them and recycle them as reflux to the upper portion of the fractionation tower. Obviously, the condensing means is an expensive commodity, particularly when the gases which are removed overhead are the light hydrocarbons ranging from $C_1$ to $C_4$, since to condense these usually requires expensive refrigeration means. Accordingly, it would be desirable to devise a method for a more economical way of operating a stripping tower.

Summary of the invention

Therefore, it is an object of this invention to provide a method for fractionation.

It is another object of this invention to provide a method for separating relatively light components in a feed mixture from relatively heavy components using an improved fractionation scheme.

It is a particular object of this invention to provide a method for separating dissolved gases from a normally liquid stream using an improved stripping column.

According to the present invention, a method for separating components of a mixture by distillation comprises the steps of: (a) introducing an unheated portion of said mixture into the upper end of a vertically disposed distillation zone maintained under distillation conditions; (b) simultaneously introducing a heated portion of said mixture into said zone at a locus intermediate the ends thereof and below the locus for said unheated portion; (c) withdrawing relatively volatile vaporous component from the top of said zone; (d) withdrawing relatively non-volatile liquid components from the bottom of said zone; (e) reboiling a portion of the liquid component as part of said conditions; and, (f) injecting a gaseous material into said zone at a locus between said intermediate locus and the return locus for the reboiled liquid.

A particular embodiment of this invention provides a method for purifying hydrocarbon oil contaminated with light gaseous material which comprises: (a) feeding a portion of said contaminated oil in unheated condition into the top section of a distillation tower maintained under distillation conditions; (b) feeding a portion of said contaminated oil in heated condition into an intermediate section of said tower; (c) withdrawing from the bottom of said tower purified hydrocarbon oil relatively free of contaminants; (d) withdrawing from the top of said tower a gaseous stream containing contaminants; (e) reboiling a portion of the purified oil as part of said conditions; and, (f) injecting a gaseous material selected from the group consisting of light hydrocarbons, hydrogen, and a mixture of light hydrocarbons and hydrogen into a lower section of said tower in an amount to provide additional vapors for stripping contaminants from hydrocarbon oil.

It is noted from the above description that one of the advantages of the present invention is the elimination of the need for reflux in the top portion of the distillation tower. As used herein, the term "reflux" is intended to include the recycle of the liquid phase condensed from the overhead vapor stream removed from the tower. Thus, the use of an unheated portion of the feed stream to the tower in the upper section of the fractionation tower operates and serves the function of reflux but is not deemed reflux in describing the present invention.

Description of the drawing

The invention may be further understood by reference to the attached drawing which is a diagrammatic representation of one manner for practicing the present invention.

Referring to the attached drawing, the feed is introduced via line 10 into the process. A portion of the feed material is split and passed via line 11 in unheated condition into fractionation tower 14 at a locus in the upper section of the tower. The other portion of the feed is passed via line 12 into indirect heat exchange with hereinafter specified relatively heavy material using exchanger 13 in order to heat that portion of the oil to distillation conditions. The heated portion of the feed is passed into fractionation tower 14 at an intermediate locus.

In fractionation tower 14 the heated material is immediately separated such that the lighter components therein pass upwardly in counter-current contact with at least a portion of the relatively unheated feed material which was introduced at the top portion thereof. The contaminants, or relatively light material, are removed from the process via line 16. The remaining relatively heavy components pass down the column in counter-current contact with a stripping gas which has been added to the process via line 15 at a locus intermediate or below the feed point and above the return locus for the hereinafter specified reboiled liquid. The action of the stripping gas is to further remove relatively light components from the descending relatively heavy components in the fractionating tower 14.

The relatively heavy components, now substantially free of the relatively light components, are withdrawn from fractionation tower 14 via line 17. A portion of the material in line 17 is passed via line 18 into steam heater 19 which acts as a reboiler to supply part of the distillation conditions. The heated material is returned to the column via line 18 at a locus near the bottom portion of fractionation tower 14.

The net product representing relatively heavy components, now substantially free of the relatively light components, is withdrawn via line 21 and passed into heat exchanger 13 in order to supply heat to that portion of the feed material passing into process via line 12. The cooled relatively heavy components are withdrawn from the process via line 21.

It is noted from the above example that the operation of the fractionation method is substantally improved in that the requirement for condensing and pumping of traditional reflux is obviated, but the utility of reflux is realized by the passing of a portion of the feed material into the upper portion of the fractionation tower in unheated condition. Therefore, what would conventionally be a stripping operation has been converted into true fractionation operation having rectification in the top portion of fractionation tower 14 and stripping in the bottom portion of fractionation tower 14. Other advantages will be obvious to those skilled in the art.

The utility of the present invention can be realized in processes such as the removal of acid gases and water from an absorption oil, such as diethylene glycol, or it can be used to remove relatively light hydrocarbons, such as the $C_1$ to $C_4$ hydrocarbons, from the hydrocarbon effluent of a conventional alkylation process. Thus, isobutane can be removed from alkylate using the concepts of the present invention.

The operating conditions necessary to practice the present invention will, of course, depend upon the type of feed material and the job to be done on the feed material. For the removal of $H_2S$ from an absorption oil, the fractionation tower may be operated at temperatures ranging from 25° C. to 200 C. and at pressures ranging from atmospheric or, in some cases, super-atmospheric or sub-atmospheric. Those skilled in the art will know how to choose the proper operating conditions in order to effectuate the desired result.

The amount of material added to the upper portion of the fractionation tower in unheated condition will also depend upon the type of separation to be achieved. Normally, the amount of material passed in unheated condition will be a minor portion of the feed with the major portion of the feed being added at the intermediate location in suitable heated condition. The concepts and claims of the invention, of course, are, on the other hand, not to be limited thereby. Those skilled in the art will know from the description of this invention how to choose the proper proportion between the unheated and the heated portions of the feed in order to realize the benefits of the present invention.

In the practice of this invention, it is necessary to use a stripping gas in the lower portion of the fractionation tower to provide additional stripping vapors. This stream of light gas provides additional stripping vapors in the stripping column which, together with those generated as a result of the application of the reboiler heat, permit removal of essentially all of the, for example, water initially present in the liquid and also permits stripping of other light components with the use of considerably less reboiler heat than would the case without the use of the stripping gas. Suitable gases of the inert type comprise light hydrocarbons, such as the $C_1$ to $C_4$ hydrocarbons, water vapor, air, nitrogen flue gas, or other inert vapors. Preferably the gaseous material is selected from the group consisting of light hydrocarbons, including the $C_1$ to $C_4$ hydrocarbons, hydrogen and a mixture of light hydrocarbons and hydrogen.

An additional benefit which is realized from adding this stripping gas below the feed inlet, is that if there are any heavy components present in the stripping gas these are initially absorbed by the relatively heavy liquid passing down through the fractionating tower thereby, to some extent, purifying the stripping gas since it will be removed overhead along with the relatively light components which are present originally in the feed material.

The invention claimed:
1. Method for separating components of a mixture by fractionation which comprises the steps of:
  (a) introducing an unheated portion of said mixture into the upper end of a vertically disposed fractionation zone maintained under fractionation conditions;
  (b) simultaneously introducing a heated portion of said mixture into said zone at a locus intermediate the ends thereof and below the locus for said upper end;
  (c) withdrawing relatively volatile vaporous component from the top of said zone;
  (d) withdrawing relatively non-volatile liquid component from the bottom of said zone;
  (e) reboiling a portion of the liquid component as part of said conditions; and,
  (f) injecting a gaseous material into said zone at a locus between said intermediate locus and the return locus for said reboiled liquid.

2. Method according to claim 1 where liquid component is passed into indirect heat exchange with a portion of said mixture to produce the heated portion of step (b).

3. Method for purifying hydrocarbon oil contaminated with light gaseous material which comprises:
  (a) feeding a portion of said contaminated oil in unheated condition into the top section of a distillation tower maintained under distillation conditions;
  (b) feeding a portion of said contaminated oil is heated condition into an intermediate section of said tower;
  (c) withdrawing from the bottom of said tower purified hydrocarbon oil relatively free of contaminants;
  (d) withdrawing from the top of said tower a gaseous stream containing contaminants;
  (e) reboiling a portion of the purified oil as part of said conditions; and,
  (f) injecting a gaseous material selected from the group consisting of light hydrocarbons, hydrogen, and a mixture of light hydrocarbons and hydrogen into a lower section of said tower in an amount to provide additional vapors for stripping contaminants from hydrocarbon oil.

4. Method according to claim 3 wherein said light hydrocarbons comprise from $C_1$ to $C_4$ paraffinic hydrocarbons.

5. Method according to claim 4 wherein said material comprises said mixture.

6. Method according to claim 4 wherein purified hydrocarbon oil is passed into indirect heat exchange with a portion of said contaminated oil to produce the heated oil of step (b).

No references cited.

HERBERT LEVINE, *Primary Examiner.*